US012750180B2

(12) United States Patent
Han

(10) Patent No.: US 12,750,180 B2
(45) Date of Patent: Sep. 29, 2026

(54) DATA TRANSMISSION METHOD AND APPARATUS, READABLE STORAGE MEDIUM, TERMINAL, AND BASE STATION

(71) Applicant: SPREADTRUM COMMUNICATIONS (SHANGHAI) CO., LTD., Shanghai (CN)

(72) Inventor: Lifeng Han, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 313 days.

(21) Appl. No.: 18/287,956

(22) PCT Filed: Apr. 8, 2022

(86) PCT No.: PCT/CN2022/085720
§ 371 (c)(1),
(2) Date: Oct. 23, 2023

(87) PCT Pub. No.: WO2022/228081
PCT Pub. Date: Nov. 3, 2022

(65) Prior Publication Data
US 2024/0214143 A1 Jun. 27, 2024

(30) Foreign Application Priority Data
Apr. 25, 2021 (CN) ........................ 202110449896.1

(51) Int. Cl.
*H04L 5/00* (2006.01)
*H04W 72/04* (2023.01)

(52) U.S. Cl.
CPC .......... *H04L 5/0048* (2013.01); *H04W 72/04* (2013.01)

(58) Field of Classification Search
CPC ............................ H04L 5/0048; H04W 72/04
See application file for complete search history.

(56) References Cited

U.S. PATENT DOCUMENTS

| | | | | |
|---|---|---|---|---|
| 9,060,360 | B2 * | 6/2015 | Yang .................... | H04L 1/0031 |
| 9,350,497 | B2 * | 5/2016 | Ji .......................... | H04L 5/0055 |
| 2013/0308524 | A1 | 11/2013 | Tavildar et al. | |
| 2020/0322031 | A1 | 10/2020 | You et al. | |
| 2024/0259791 | A1 * | 8/2024 | Shimezawa ............ | H04W 8/30 |

FOREIGN PATENT DOCUMENTS

| | | | |
|---|---|---|---|
| CN | 108121606 | A | 6/2018 |
| CN | 109962756 | A | 7/2019 |
| CN | 111726658 | A | 9/2020 |

OTHER PUBLICATIONS

International Search Report for International Application No. PCT/CN2022/085720; Mailing Date, Jun. 29, 2022.

* cited by examiner

*Primary Examiner* — Chandrahas B Patel
(74) *Attorney, Agent, or Firm* — CANTOR COLBURN LLP

(57) ABSTRACT

A data transmission method and apparatus, a storage medium, a terminal, and a base station are provided. The method includes: transmitting request information, where the request information includes an upper layer instruction; and transmitting reference information, where the reference information is used to describe response information; where the response information is a message in response to the request information.

3 Claims, 3 Drawing Sheets

DATA TRANSMISSION METHOD AND APPARATUS, READABLE STORAGE MEDIUM, TERMINAL, AND BASE STATION

CROSS-REFERENCE TO RELATED APPLICATIONS

This is the U.S. national stage of application No. PCT/CN2022/085720, filed on Apr. 8, 2022. Priority under 35 U.S.C. § 119(a) and 35 U.S.C. § 365(b) is claimed from Chinese Application No. 202110449896.1, filed Apr. 25, 2021, the disclosure of which is also incorporated herein by reference.

TECHNICAL FIELD

The present disclosure generally relates to communication technology field, and more particularly, to a data transmission method and apparatus, a readable storage medium, a terminal, and a base station.

BACKGROUND

Extended Reality (XR) represents merging a physical environment with a virtual environment or providing a fully immersive virtual experience environment. XR can image physical objects into realistic three-dimensional images. As comprehension of Virtual Reality (VR), Augmented Reality (AR) and Mixed Reality (MR) technologies, XR has broad application prospects in 5G era.

Among types of XR services, a most interactive Cloud Gaming (CG) service can transmit game screens online to a user end through cloud computing, allowing users to play games without a game console. When such a service is running, an action input of a user serves as uplink data, passes through a User Equipment (UE), a base station, a User Plane Function (UPF) and an Internet Protocol (IP) network, and is finally transmitted to a CG server. The CG server generates, based on the action input of the user, a corresponding game screen which is then transmitted to the user through the IP network, the UPF, the base station and the UE.

SUMMARY

Embodiments of the present disclosure provide a data transmission method and apparatus, a readable storage medium, a terminal, and a base station, which may effectively avoid a waste of resources while realizing effective transmission.

In an embodiment of the present disclosure, a data transmission method is provided, including: transmitting request information, where the request information includes an upper layer instruction: and transmitting reference information, where the reference information is used to describe response information: where the response information is a message in response to the request information.

In an embodiment of the present disclosure, a data transmission method is provided, including receiving request information, where the request information includes an upper layer instruction; and receiving reference information, where the reference information is used to describe response information: where the response information is a message in response to the request information.

In an embodiment of the present disclosure, a terminal which includes a memory, and a processor is provided, where the memory has computer instructions stored therein, and when the processor executes the computer instructions, the above data transmission method is performed.

DETAILED DESCRIPTION

As described in the background, among different types of XR services, a most interactive CG service can transmit game screens online to a user end through cloud computing, allowing users to play games without a game console.

Figure 1:
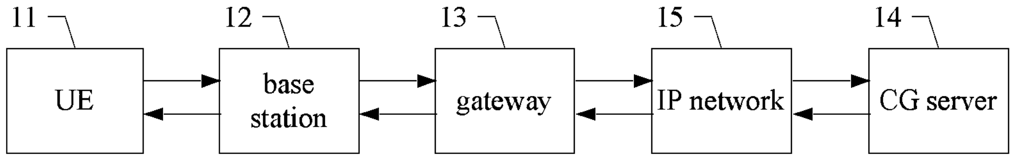
FIG. 1 is a diagram of data flow of XR service in existing techniques.

Referring to FIG. 1, FIG. 1 is a diagram of data flow of XR service in existing techniques.

As shown in FIG. 1, an arrow to the right represents uplink data which may be instruction information of a user, and an arrow to the left represents downlink data which may be a game screen and sound information generated by a CG server.

Specifically, the user's action input is transmitted as uplink data to a CG server 14 via a UE 11, a base station 12 and a gateway 13, or to a CG server 14 via a UE 11, the base station 12, the gateway 13 and an IP network 15. Then the CG server 14 may generate a corresponding game screen according to the user's action input, and the corresponding game screen is transmitted to a user end via the gateway 13, the base station 12 and the UE 11, or transmitted to the user via the IP network 15, the gateway 13, the base station 12, and the UE 11.

Inventors of the present disclosure discovered through research that in the existing techniques, there is a lack of information interaction between the base station and the UE, resulting in the base station being unable to perform scheduling preparation before receiving response information. For example, it is unable to make advance detection to channel quality based on a transmitting time point of a server, and thus it is unable to reasonably select a modulation and demodulation mode of the response information and to schedule time-frequency resources for transmitting to a terminal in advance based on a data amount of the response information. Consequently, in the existing techniques, it is prone to cause a waste of resources due to an unreasonable modulation and demodulation mode, or a transmission failure due to improper scheduling of time-frequency resources.

The inventors of the present disclosure further discovered through research that as a game screen generated by the server depends on the user's input information, there is a close correlation between the uplink and downlink data. From the perspective of a wireless network, whenever uplink data is transmitted via the wireless network, there will be downlink data transmitted via the wireless network within a certain time period.

In the embodiments of the present disclosure, by transmitting request information including an upper layer instruction and transmitting reference information used to describe response information that is a message in response to the request information, information interaction between the base station and the UE is realized, thereby enabling the base station to perform scheduling preparation before receiving the response information, which may effectively avoid a waste of resources while realizing efficient transmission.

In order to clarify the objects, characteristics and advantages of the disclosure, embodiments of present disclosure will be described in detail in conjunction with accompanying drawings.

Figure 2:
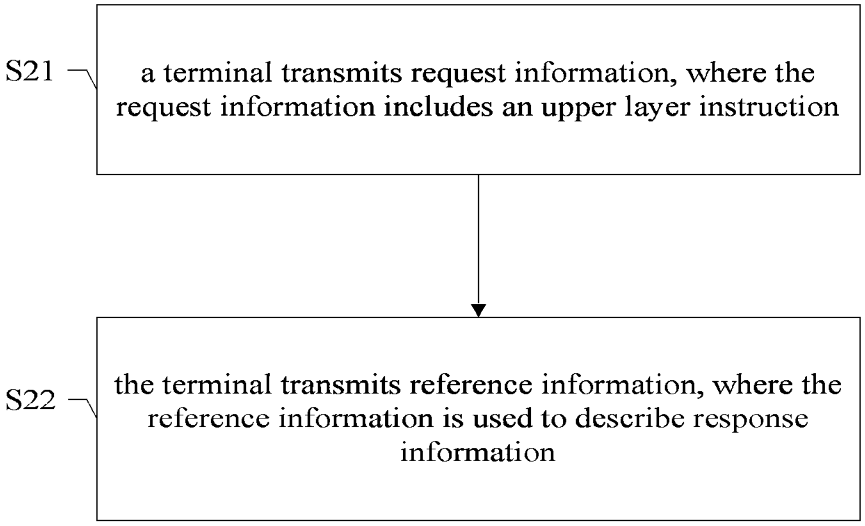
FIG. 2 is a flow chart of a data transmission method according to an embodiment.

Referring to FIG. 2, FIG. 2 is a flow chart of a data transmission method according to an embodiment. The data transmission method may be applied to a terminal side, and may include S21 and S22.

In S21, a terminal transmits request information, where the request information includes an upper layer instruction.

In S22, the terminal transmits reference information, where the reference information is used to describe response information.

The response information is a message in response to the request information.

It could be understood that, in some embodiments, the method may be implemented in a form of a software program which runs in a processor integrated in a chip or a chip module.

In some embodiments, in S21, the request information may include the received upper layer instruction and may be transmitted by a UE. More specifically, the request information may be transmitted by a UE access layer.

Specifically, the data transmission method may be used in cloud games, and the upper layer instruction may be action information transmitted by a UE application layer, for example, it may be CG action request information. In some embodiments, a terminal application layer may generate CG action request information and transmit the request information to a terminal access layer.

In some embodiments, in S22, the reference information may be selected from a variety of parameters.

Specifically, the reference information may include a waiting duration between receiving the upper layer instruction from a UE access layer and transmitting the request information by the UE access layer. The waiting duration may be used to describe a time point when the response information arrives at a base station. The reference information may include an importance level of the response information or indication information of the importance level. The reference information may include a data amount of the response information or indication information of the data amount time.

In the embodiments of the present disclosure, by transmitting request information including an upper layer instruction and transmitting reference information used to describe response information that is a message in response to the request information, information interaction between the base station and the UE is realized, thereby enabling the base station to perform scheduling preparation before receiving the response information, which may effectively avoid a waste of resources while realizing efficient transmission.

Further, in some embodiments, the reference information includes a waiting duration between receiving the upper layer instruction from a UE access layer and transmitting the request information by the UE access layer.

Specifically, the waiting duration may be measured by the UE access layer. Specifically, a time point at which the UE access layer receives the upper layer instruction (i.e., receives information from an upper layer) can be recorded as a start time point. A time point at which the UE access layer transmits the upper layer instruction to the base station can be recorded as a termination time point. The waiting duration may be a time difference between the start time point and the termination time point.

Figure 3:
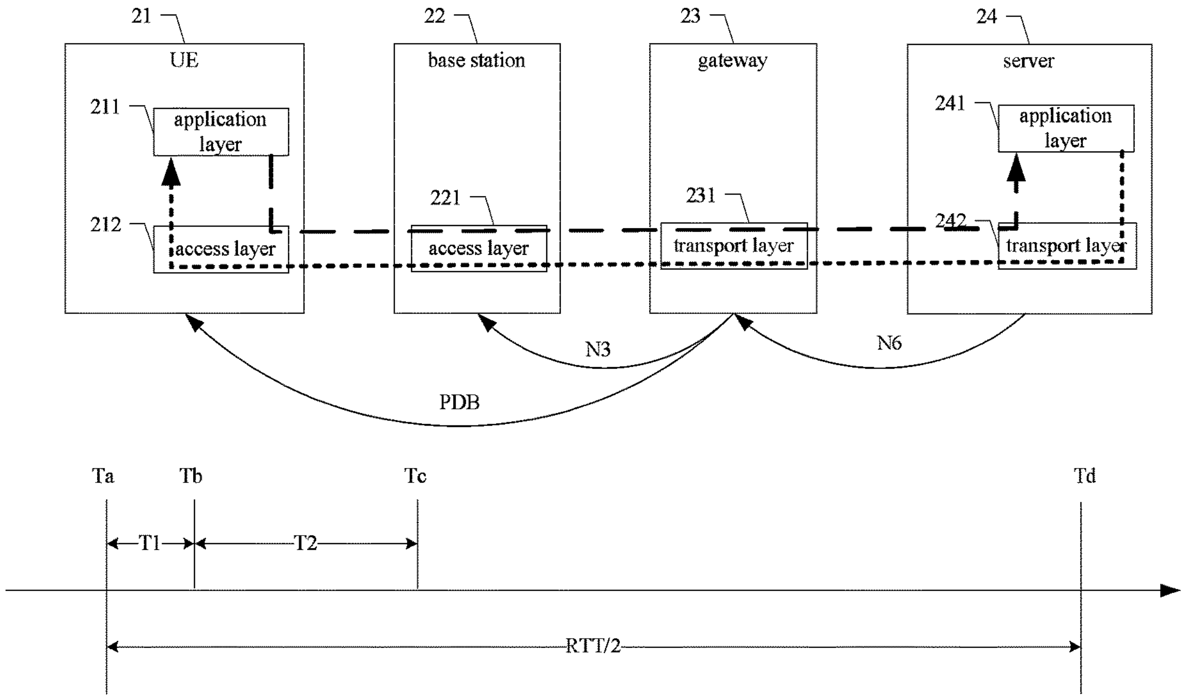
FIG. 3 is a diagram of node time points during a data transmission process according to an embodiment.

Referring to FIG. 3, FIG. 3 is a diagram of node time points during a data transmission process according to an embodiment.

Specifically, an application layer 211 of a UE 21 may transmit an upper layer instruction to an access layer 212 of the UE 21. The access layer 212 may transmit request information and a waiting duration to an access layer 221 of a base station 22. The access layer 221 of the base station 22 receives the request information and the waiting duration and forwards them to a transport layer 231 of a gateway 23. The request information and the waiting duration are forwarded to a server 24 by the transport layer 231 of the gateway 23, and transmitted to an application layer 241 of the server 24 via a transport layer 242 of the server 24. In response to the request information, the application layer 241 of the server 24 generates response information.

More specifically, at a time point Ta, the application layer 211 of the UE 21 transmits the upper layer instruction to the access layer 212 of the UE 21, and at a time point Tb, the UE 21 transmits the request information including the upper layer instruction to the base station 22. At this time, T1 is determined, which represents the waiting duration between the UE application layer 211 of the UE 21 transmitting the upper layer instruction and the access layer 212 of the UE 21 transmitting the request information. T1 may also be understood as a time duration for data packets to be stored inside the UE for waiting to be transmitted. It could be understood that at time point Tb, the access layer 212 of the UE 21 transmits the request information to the base station 22.

Further, the waiting duration is transmitted together with the request information, or the waiting duration is transmitted after the request information is transmitted.

Specifically, the UE 21 may report T1 along with the request information, or may use additional signaling to report T1 when transmitting the request information.

It should be noted that the UE 21 needs to report T1 before the server transmits the response information, so that the base station 22 can calculate a time point when the response information reaches the base station 22 based on the waiting duration.

At a time point Tc, the base station 22 receives the request information. After receiving T1, it may calculate an air interface (Uu) transmission delay based on T1.

Specifically, T2 is a time duration between the time point Tb and the time point Tc, which represents the T2 time duration between the UE 21 transmitting the request information and the base station 22 receiving the request information, i.e., the above-mentioned air interface transmission delay.

In some embodiments, if there is a Hybrid Automatic Repeat reQuest (HARQ), the base station 22 may calculate a HARQ retransmission time within T2.

Further, the base station 22 calculating the time point when the response information reaches the base station 22 based on the waiting duration includes: determining a Round-Trip Time (RTT) from the UE application layer 211 transmitting the upper layer instruction to the UE application layer 211 receiving the response information from the server 24; determining the T2 duration from the UE 21 transmitting the request information to the base station 22 receiving the request information: and calculating, based on the waiting duration, the RTT duration and the T2 duration, the time point when the response information arrives at the base station 22.

It should be noted that the time point when the response information reaches the base station 22 can be regarded as a sum of the time point Td when the server 24 transmits the response information, N3 and N6. N3 represents a predicted time duration from the gateway 23 transmitting the response information to the base station 22 receiving the response information, and N6 represents a predicted time duration from the server 24 transmitting the response information to the gateway 23 receiving the response information.

Therefore, in the following three specific embodiments, the time point Td when the server 23 transmits the response information may be calculated, and then based on Td+N3+N6, the time point when the response information reaches the base station 22 can be estimated.

In some embodiments, the base station 22 may further calculate or obtain the RTT, that is, the time duration between the application layer 211 of the UE 21 transmitting the upper layer instruction and the application layer 211 of the UE 21 receiving the response information from the server 24.

It should be noted that in practice, the RTT that elapses from when the application layer 211 of the UE 21 transmits the uplink request information to when the application layer 211 of the UE 21 receives the downlink response information may not be constant. For example, in a CG service, uplink instruction transmitted by the application layer 211 of the UE 21 corresponds to a downlink game scene different from a game scene in a previous frame. If a corresponding server operation load becomes larger, the RTT becomes longer; otherwise, the RTT becomes shorter. In this case, the access layer 212 of the UE 21 may notify the base station 22 of predicted arrival information of the corresponding downlink response information when transmitting uplink data, so that the base station 22 does not need to perform calculation based on the foregoing formula, but directly acquires the RTT or determines the RTT through simple calculation.

The predicted arrival information may be indicated as single RTT time length, or may be indicated as a Global Positioning System (GPS) time point when the downlink response information reaches the base station 22.

In some embodiments, a time point when the server 24 transmits the response information is calculated based on the waiting duration, the RTT duration and the T2 duration using a following formula:

$$T = RTT/2 - (T1 + T2),$$

where T is the time point when the server 24 transmits the response information, RTT is the RTT duration from the time point Ta when the UE application layer 211 transmits the upper layer instruction to the time point when the UE application layer 211 receives the response information from the server 24, T1 is a waiting duration from the time point when the UE application layer 211 transmits the upper layer instruction to the time point when the UE 21 transmits the request information, and T2 is the T2 duration from the time point when the UE 21 transmits the request information to the time point when the base station 22 receives the request information.

It should be noted that to indicate the time point when the server 24 transmits the response information, a reference value needs to be set, and the reference value with an elapsed time length T is the time point when the server 24 transmits the response information. The reference value is the time point when the base station 22 receives the request information from the UE 21, for example, the time point Tc as shown in FIG. 3.

In some embodiments, the time point when the server 24 transmits the response information is calculated based on the waiting duration, the RTT duration and the T2 duration using a following formula:

$$T = RTT/2 - (T1 + T2),$$

where T is the time point when the server 24 transmits the response information, RTT is the RTT duration from the time point when the UE application layer 211 transmits the upper layer instruction to the time point when the UE application layer 211 receives the response information from the server 24, T1 is a waiting duration from the time point when the UE application layer 211 transmits the upper layer instruction to the time point when the UE 21 transmits the request information, T2 is the T2 duration from the time point when the UE 21 transmits the request information to the time point when the base station 22 receives the request information, N3 is a predicted duration between a time point when a gateway 23 transmits the response information and a time point when the base station 22 receives the response information, and N6 is a predicted duration between a time point when the server 24 transmits the response information and a time point when the gateway 23 receives the response information.

It should be noted that to indicate the time point when the server 24 transmits the response information, a reference value needs to be set, and the reference value with an elapsed time length T is the time point when the server 24 transmits the response information. The reference value is the time point when the base station 22 receives the request information from the UE 21, for example, the time point Tc as shown in FIG. 3.

In some embodiments, the time point when the server 24 transmits the response information is calculated based on the waiting duration, the RTT duration and the T2 duration using a following formula:

$$T = RTT - (PDB - N3) - (T1 + T2),$$

where T is the time point when the server 24 transmits the response information, RTT is the RTT duration from the time point when the UE application layer 211 transmits the upper layer instruction to the time point when the UE application layer 211 receives the response information from the server 24, T1 is a waiting duration from the time point when the UE application layer 211 transmits the upper layer instruction to the time point when the UE 21 transmits the request information, T2 is the T2 duration from the time point when the UE 21 transmits the request information to the time point when the base station 22 receives the request information, PDB is a predicted duration between a time point when a gateway transmits the response information and a time point when the UE receives the response information, and N3 is a predicted duration between the time point when the gateway 23 transmits the response information and a time point when the base station 22 receives the response information.

It should be noted that to indicate the time point when the server 24 transmits the response information, a reference value needs to be set, and the reference value with an elapsed time length T is the time point when the server 24 transmits the response information. The reference value is the time point when the base station 22 receives the request information from the UE 21, for example, the time point Tc as shown in FIG. 3.

It could be understood that, in a process of determining a Packet Delay Budget, (PDB), a time point when the UE 21 is predicted to receive the response information may specifically be the time point when the application layer 211 of the UE 21 receives the response information.

In the embodiments of the present disclosure, the reference information includes the waiting duration from the UE access layer 211 receiving the upper layer instruction to the UE access layer 211 transmitting the request information. Accordingly, the base station can prepare for scheduling before receiving the response information, for example, detecting channel quality in advance based on a transmission time point of the server, and then reasonably select a modulation and demodulation mode of the response information.

In the embodiments of the present disclosure, the reference information includes the waiting duration from the UE access layer receiving the upper layer instruction to the UE access layer transmitting the request information. Accordingly, the base station can prepare for scheduling before receiving the response information, for example, detecting channel quality in advance based on a transmission time point of the server, and then reasonably select a modulation and demodulation mode of the response information.

Further, in some embodiments, the reference information includes the importance level of the response information or the indication information of the importance level.

Specifically, the terminal receiving layer may receive the importance level of the response information from the terminal application layer.

The response information may be generated by the server in response to the request information.

Specifically, after the terminal application layer receives the upper layer signaling and transmits it to the server, the server may generate the response information. The response information has an importance level which may be represented by Y. The terminal application layer may predict the importance level, and transmit a prediction result to the base station via the terminal access layer.

The Y may be a numerical value, where the larger the numerical value, the higher the importance level, or the smaller the numerical value, the higher the importance level. Alternatively, the Y may be indication information of the importance level, such as an index value.

It should be noted that in addition to predicting the importance level, the terminal application layer may also predict a data amount of the response information.

In the embodiments of the present disclosure, the reference information includes the importance level of the response information or the indication information of the importance level. The base station can make scheduling preparation before receiving the response information. For example, the base station may reasonably select the modulation and demodulation mode of the response information based on the importance level of the response information, so as to effectively avoid a waste of resources while realizing efficient transmission.

In some embodiments, the reference information may be a data amount of the response information or indication information of the data amount.

Specifically, after the terminal application layer receives the upper layer signaling and transmits it to the server, the server may generate the response information. A data size of the response information may be represented by X, for example, X bits, where the X may be a number of bits, or indication information of the data amount, such as an index value. The terminal access layer may determine a size of the response information through table lookup or calculation based on the indication information of the data amount.

In the embodiments of the present disclosure, the reference information is the data amount of the response information or the indication information of the data amount. The base station can make scheduling preparation after determining a time point when a downlink data packet arrives. For example, the base station may require the UE to measure and report a more accurate CSI value in advance, or adjust the UE to a BWP with a larger bandwidth, which may improve quality of communication.

The size of the response information may be an original information size, or an original information size plus a size of each IP header obtained after IP fragmentation of the original information, or a data packet size obtained after IP fragmentation of the original information IP and adding headers of packets such as TCP and UDP, or a data packet size obtained after adding other protocol headers.

Referring to Table 1, Table 1 illustrates a prediction result of the terminal application layer based on multiple data.

TABLE 1

| | Data amount | Importance |
|---|---|---|
| Data A | X_A | Y_A |
| Data B | X_B | Y_B |
| Data C | X_C | Y_C |
| Data D | X_D | Y_D |
| Total | X_A + X_B + X_C + X_D | |

As shown in Table 1, if the response information which the terminal application layer predicts the server to generate has multiple importance levels, it can be represented by a combination of the above X and Y.

It should be noted that the above prediction result may be predicted in granularity of session, flow or Data Radio Bearer (DRB).

Specifically, predicting the importance level of the response information generated by the server based on a service type may include: dividing the response information in the granularity of data flow, and predicting the importance level of each data flow of the response information by the UE application layer, where different data flow types have respective preset importance levels.

Said predicting the importance level of the response information generated by the server based on the service type may include: dividing the response information with DRB as the granularity, and predicting the importance level of each DRB of the response information by the UE access layer, where different DRB types have respective preset importance levels.

Predicting a data amount of the response information generated by the server based on the service type may include: dividing the response information in the granularity of data flow, and predicting the data amount of each data flow of the response information by the UE application layer, where different data flow types have respective preset data amounts.

Said predicting the data amount of the response information generated by the server based on the service type may include: dividing the response information with DRB as the granularity, and predicting the data amount of each DRB of the response information by the UE access layer, where different DRB types have respective preset data amounts.

Referring to Table 2, Table 2 illustrates a prediction result of the terminal application layer based on multiple services.

TABLE 2

| | Data amount | Importance |
|---|---|---|
| Session A | X_A | Y_A |
| Session B | X_B | Y_B |
| Session C | X_C | Y_C |
| Session D | X_D | Y_D |
| Total | X_A + X_B + X_C + X_D | |

Specifically, the terminal application layer may make a prediction and then notify the terminal access layer. It predicts how much data each service has in the downlink response information and what its respective importance level is. The terminal access layer notifies the base station of how much data does each service have and what its importance level is.

Referring to Table 3, Table 3 illustrates a prediction result of the terminal application layer based on multiple data flows.

TABLE 3

| | Data amount | Importance |
|---|---|---|
| Flow A | X_A | Y_A |
| Flow B | X_B | Y_B |
| Flow C | X_C | Y_C |
| Flow D | X_D | Y_D |
| Total | X_A + X_B + X_C + X_D | |

Specifically, the terminal application layer may make a prediction and then notify the terminal access layer. It predicts how much data each data flow has in the downlink response information and what its respective importance level is. Then the terminal access layer notifies the base station of how much data does each data flow have and what its importance level is.

Referring to Table 4, Table 4 illustrates a prediction result of the terminal application layer based on multiple DRBs.

TABLE 4

| | Data amount | Importance |
|---|---|---|
| DRB A | X_A | Y_A |
| DRB B | X_B | Y_B |
| DRB C | X_C | Y_C |
| DRB D | X_D | Y_D |
| Total | X_A + X_B + X_C + X_D | |

Specifically, the terminal application layer may make a prediction in the granularity of data flow and notify the terminal access layer. The terminal access layer obtains information of "how much data each DRB has, and what the importance level is" based on a corresponding relationship between data flow and DRB, and notifies the base station of the information.

Further, the importance level or the indication information of the importance level is transmitted together with the request information, or the importance level or the indication information of the importance level is transmitted before or after the request information is transmitted.

Specifically, the terminal access layer may transmit the request information and the importance level, or the terminal access layer may transmit the request information and the indication information of the importance level, where the request information includes the received upper layer instruction.

Specifically, the importance level or the indication information of the importance level is transmitted together with the request information, or the importance level or the indication information of the importance level is transmitted after the request information is transmitted.

In some embodiments, the request information and the importance level or the indication information of the importance level may be transmitted respectively. The request information may be transmitted first, and then the importance level or the indication information of the importance level is transmitted.

In some embodiments, the importance level or the indication information of the importance level may be transmitted first, and then the request information is transmitted.

A time interval for transmitting the request information and the importance level respectively is selected from a group consisting of base station pre-configuration, network manager pre-configuration, UE application layer pre-configuration, or UE decision.

The network manager may be an appropriate network device, such as a server. The UE decision may be made by the UE access layer.

Further, the importance level or the indication information of the importance level may be transmitted through Media Access Control-Control Element (MAC CE), or through Radio Link Control (RLC) control MAC Protocol Data Unit (control PDU), or through Packet Data Convergence Protocol (PDCP) control PDU, or through control PDU corresponding to a new protocol layer, which is not limited in the embodiments of the present disclosure.

In the embodiments of the present disclosure, by setting the step for the terminal to transmit the request information to the base station, information interaction between the base station and the UE is realized, thereby enabling the base station to prepare for scheduling before receiving the response information, for example, detecting channel quality in advance based on the transmission time point of the server. In this manner, a reasonable selection of the modulation and demodulation mode of the response information is made, for example, based on the importance level of the response information, to effectively avoid a waste of resources while realizing efficient transmission.

Further, the data amount or the indication information of the data amount is transmitted together with the request information, or the data amount or the indication information of the data amount is transmitted before or after the request information is transmitted.

In some embodiments, the request information and the data amount or the indication information of the data amount may be transmitted respectively. The request information may be transmitted first, and then the data amount or the indication information of the data amount is transmitted.

In some embodiments, the data amount or the indication information of the data amount may be transmitted first, and then the request information is transmitted.

A time interval for transmitting the request information and the data amount respectively can be referred to the above descriptions and is not repeated here.

In the embodiments of the present disclosure, by configuring the terminal to transmit the data amount of the response information to the base station, the base station can make scheduling preparation after determining a time point when a downlink data packet arrives. For example, the base station may require the UE to measure and report a more accurate CSI value in advance, or adjust the UE to a BWP with a larger bandwidth, which may improve quality of communication.

It should be noted that as the data amount reported by the UE is a predicted value rather than an accurate value, the prediction information may be transmitted through a pre-configured sub-template. For example, the indication information of the data amount mentioned above may be a pre-configured sequence number or index of the sub-template.

Figure 4:
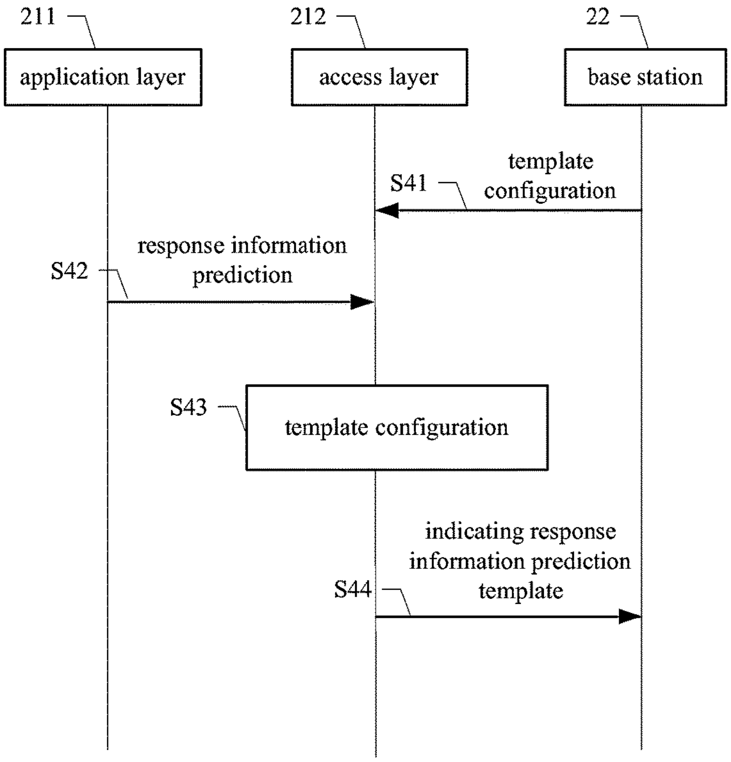
FIG. 4 is a data flow diagram of a method for transmitting indication information of a data amount according to an embodiment.

Referring to FIG. 4, FIG. 4 is a data flow diagram of a method for transmitting indication information of a data amount according to an embodiment. The method may include S41 to S44 each of which is described below.

In S41, the base station 22 may perform template configuration.

Specifically, multiple sub-templates (such as sub-template 1 to sub-template N) may be pre-configured, and each sub-template has a preset data amount, such as sub-template 1 corresponds to 100 Mbps, sub-template 2 corresponds to 75 Mbps, until sub-template 5 corresponds to 5 Mbps.

It should be noted that the sub-template may further include importance level information, for example, sub-template 1 corresponds to importance level Y_A and 100 Mbps, sub-template 2 corresponds to importance level Y_A and 75 Mbps, sub-template 3 corresponds to importance level Y_B and 100 Mbps, and sub-template 4 corresponds to importance level Y_B and 75 Mbps.

In S42, the access layer 212 of the UE may perform response information prediction.

Specifically, the access layer 212 of the UE may receive a data amount prediction of the response information from the application layer 211. For example, data A (or Session A, or Flow A, or DRB A) is 80 Mbps, and data B (or Session B, or Flow B, or DRB B) is 110 Mbps.

It should be noted that the access layer 212 of the UE may receive the importance level prediction of the response information from the application layer 211, for example, data A (or Session A, or Flow A, or DRB A) is importance level Y_A, and data B (or Session B, or Flow B, or DRB B) corresponds to importance level Y_B.

In S43, the access layer 212 of the UE may perform template matching.

The access layer 212 of the UE may match the data amount of each data with sub-templates and determine the sub-template most matching the data amount. Data A (or Session A, or Flow A, or DRB A) is 80 Mbps and can match template 2, and data B (or Session B, or Flow B, or DRB B) is 110 Mbps and can match template 1.

It should be noted that the access layer 212 of the UE may perform criticism based on the importance level of each data. For example, data A (or Session A, or Flow A, or DRB A) is 80 Mbps and has importance level Y_B, and thus can match template 4, and data A (or Session A, or Flow A, or DRB A) is 100 Mbps and has importance level Y_A, and thus can match template 1.

In S44, the access layer 212 of the UE may indicate a response information prediction template to the base station 22.

Specifically, each data (or each Session, or each Flow, or each DRB) may be indicated one by one.

In the embodiments of the present disclosure, signaling overhead is effectively reduced by setting the indication information to indicate the data amount and the importance level, especially by pre-configuring the sub-templates. As the data amount reported by the UE is a predicted value rather than an accurate value, the use of the indication information may not unduly affect accuracy of transmitted information.

Still referring to FIG. 1, in some embodiments, in S11, the request information further includes a service type, and said determining the RTT duration from the time point when the UE application layer transmits the upper layer instruction to the time point when the UE application layer receives the response information from the server includes: determining the RTT duration from the time point when the UE application layer transmits the upper layer instruction to the time point when the UE application layer receives the response information from the server based on the service type.

Specifically, taking a CG service as an example, the service type may be selected from scene service, character service or action service. It could be understood that different service types have respective transmission durations which may be estimated or recorded in advance. Therefore, the RTT duration can be determined based on the service type.

Further, the request information further includes a service channel used to transmit the request information, and said determining the RTT duration from the time point when the UE application layer transmits the upper layer instruction to the time point when the UE application layer receives the response information from the server includes: determining the RTT duration from the time point when the UE application layer transmits the upper layer instruction to the time point when the UE application layer receives the response information from the server based on the service channel.

Specifically, taking the CG service as an example, the service channel may be selected from scene service channel, character service channel or action service channel. It could be understood that different service channels have respective transmission durations which may be estimated or recorded in advance. Therefore, the RTT duration can be determined based on the service channel.

In the embodiments of the present disclosure, by setting the step for the terminal to transmit the request information to the base station, information interaction between the base station and the UE is realized, thereby enabling the base station to prepare for scheduling before receiving the response information, for example, detecting channel quality in advance based on the transmission time point of the server. In this manner, a reasonable selection of the modulation and demodulation mode of the response information is made, for example, based on the importance level of the response information, to effectively avoid a waste of resources while realizing efficient transmission.

Figure 5:
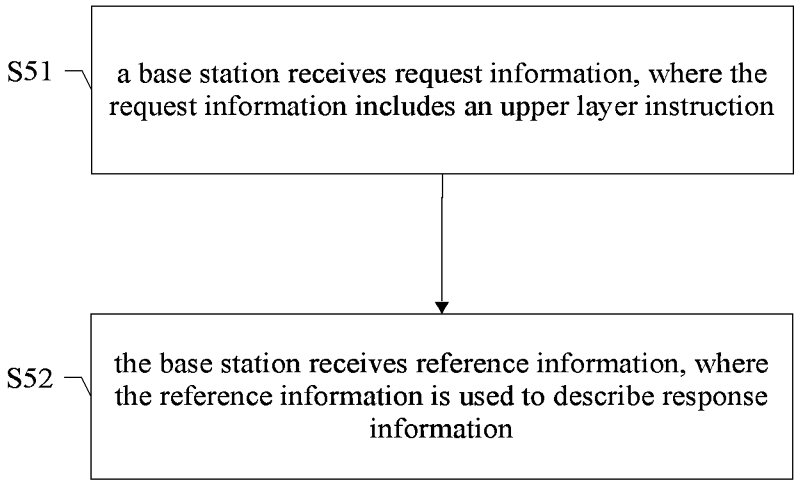
FIG. 5 is a flow chart of a data transmission method according to an embodiment.

Referring to FIG. 5, FIG. 5 is a flow chart of a data transmission method according to an embodiment. The data transmission method may be applied to a base station side, and include S51 and S52.

In S51, a base station receives request information, where the request information includes an upper layer instruction.

In S52, the base station receives reference information, where the reference information is used to describe response information.

The response information is a message in response to the request information.

It could be understood that, in some embodiments, the method may be implemented in a form of a software program which runs in a processor integrated within a chip or a chip module.

Further, the reference information includes a waiting duration between receiving the upper layer instruction from a UE access layer and transmitting the request information by the UE access layer.

Further, the data transmission method further includes: calculating a time point when the response information reaches a base station based on the waiting duration.

Further, said calculating the time point when the response information reaches the base station based on the waiting duration includes: determining an RTT duration from a time point when a UE application layer transmits the upper layer instruction to a time point when the UE application layer receives the response information from a server; determine a T2 duration from a time point when the UE transmits the request information to a time point when the base station receives the request information: and calculating the time point when the response information reaches the base station based on the waiting duration, the RTT duration and the T2 duration.

It should be noted that the time point when the response information reaches the base station can be regarded as a sum of the time point when the server transmits the response information, N3 and N6. Therefore, the time point when the server transmits the response information may be calculated first.

In some embodiments, a time point when the server transmits the response information is calculated based on the waiting duration, the RTT duration and the T2 duration using a following formula:

$$T=[RTT/2-(T1+T2)]\times 2,$$

where T is the time point when the server transmits the response information, RTT is the RTT duration from the time point when the UE application layer transmits the upper layer instruction to the time point when the UE application layer receives the response information from the server, T1 is a waiting duration from the time point when the UE application layer transmits the upper layer instruction to the time point when the UE transmits the request information, and T2 is the T2 duration from the time point when the UE transmits the request information to the time point when the base station receives the request information.

In some embodiments, the time point when the server transmits the response information is calculated based on the waiting duration, the RTT duration and the T2 duration using a following formula:

$$T=RTT/2-(T1+T2),$$

where T is the time point when the server transmits the response information, RTT is the RTT duration from the time point when the UE application layer transmits the upper layer instruction to the time point when the UE application layer receives the response information from the server, T1 is a waiting duration from the time point when the UE application layer transmits the upper layer instruction to the time point when the UE transmits the request information, T2 is the T2 duration from the time point when the UE transmits the request information to the time point when the base station receives the request information, N3 is a predicted duration between a time point when a gateway transmits the response information and a time point when the base station receives the response information, and N6 is a predicted duration between a time point when the server transmits the response information and a time point when the gateway receives the response information.

In some embodiments, the time point when the server transmits the response information is calculated based on the waiting duration, the RTT duration and the T2 duration using a following formula: T=RTT−(PDB−N3)−(T1+T2), where T is the time point when the server transmits the response information, RTT is the RTT duration from the time point when the UE application layer transmits the upper layer instruction to the time point when the UE application layer receives the response information from the server, T1 is a waiting duration from the time point when the UE application layer transmits the upper layer instruction to the time point when the UE transmits the request information, T2 is the T2 duration from the time point when the UE transmits the request information to the time point when the base station receives the request information, PDB is a predicted duration between a time point when a gateway transmits the response information and a time point when the UE receives the response information, and N3 is a predicted duration between the time point when the gateway transmits the response information and a time point when the base station receives the response information.

More details of the execution steps at the time point when the server transmits the response information may be referred to the foregoing and the relevant descriptions of FIGS. 1 to 4, and are not repeated here.

Further, the request information further includes a service type, and said determining the RTT duration from the time point when the UE application layer transmits the upper layer instruction to the time point when the UE application layer receives the response information from the server includes: determining the RTT duration from the time point when the UE application layer transmits the upper layer instruction to the time point when the UE application layer receives the response information from the server based on the service type.

Further, the request information further includes a service channel used to transmit the request information, and said determining the RTT duration from the time point when the UE application layer transmits the upper layer instruction to the time point when the UE application layer receives the response information from the server includes: determining the RTT duration from the time point when the UE application layer transmits the upper layer instruction to the time point when the UE application layer receives the response information from the server based on the service channel.

Further, the waiting duration is received together with the request information, or the waiting duration is received after the request information is received.

In the embodiments, the reference information includes the waiting duration from the UE access layer receiving the upper layer instruction to the UE access layer transmitting the request information. Accordingly, the base station can prepare for scheduling before receiving the response information, for example, detecting channel quality in advance based on a transmission time point of the server, and then reasonably select a modulation and demodulation mode of the response information.

Further, in some embodiments, the reference information includes an importance level of the response information or indication information of the importance level.

Further, the importance level or the indication information of the importance level is received together with the request information, or the importance level or the indication information of the importance level is received before or after the request information is received.

In the embodiments, the reference information includes the importance level of the response information or the indication information of the importance level. The base station can make scheduling preparation before receiving the response information. For example, the base station may reasonably select the modulation and demodulation mode of the response information based on the importance level of the response information, so as to effectively avoid a waste of resources while realizing efficient transmission.

Further, in some embodiments, the reference information includes a data amount of the response information or indication information of the data amount.

Further, the data amount or the indication information of the data amount is received together with the request information, or the data amount or the indication information of the data amount is received before or after the request information is received.

In the embodiments, the reference information is the data amount of the response information or the indication information of the data amount. The base station can make scheduling preparation after determining a time point when a downlink data packet arrives. For example, the base station may require the UE to measure and report a more accurate CSI value in advance, or adjust the UE to a BWP with a larger bandwidth, which may improve quality of communication.

More details about S51 to S52 may be referred to the foregoing and the descriptions of FIGS. 1 to 4, and are not repeated here.

It should be noted that, selecting a modulation and demodulation mode of the response information based on the calculated transmission time point may include: detecting current channel quality before the calculated transmission time point; and selecting the modulation and demodulation mode based on the detection result of the current channel quality, where the higher the channel quality is, the higher the order of the modulation and demodulation mode is.

Selecting a modulation and demodulation mode of the response information based on the importance level may include: transmitting data flows with the same importance level together, or transmitting DRBs with the same importance level together, where the higher the importance level is, the lower the order of the modulation and demodulation mode is.

Figure 6:
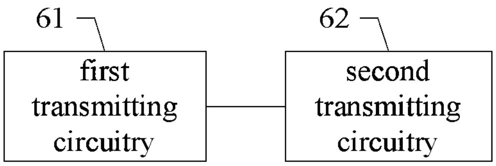
FIG. 6 is a block diagram of a data transmission apparatus according to an embodiment.

Referring to FIG. 6, FIG. 6 is a block diagram of a data transmission apparatus according to an embodiment. The data transmission apparatus includes: a first transmitting circuitry 61 configured to transmit request information, where the request information includes an upper layer instruction: and a second transmitting circuitry 62 configured to transmit reference information, where the reference information is used to describe response information, where the response information is a message in response to the request information.

In some embodiments, the above apparatus may correspond to a chip with a data processing function in a UE, such as a baseband chip, or to a chip module including a chip with a data processing function in a UE, or to a UE.

More details of principles, implementation and advantages of the data transmission apparatus can be referred to the above descriptions and related descriptions of the data transmission method in FIG. 1 to FIG. 4, and are not repeated here.

Figure 7:
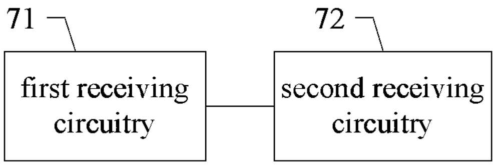
FIG. 7 is a block diagram of a data transmission apparatus according to an embodiment.

Referring to FIG. 7, FIG. 7 is a block diagram of a data transmission apparatus according to an embodiment. The data transmission apparatus includes: a first receiving circuitry 71 configured to receive request information, where the request information includes an upper layer instruction: and a second receiving circuitry 72 configured to receive reference information, where the reference information is used to describe response information, where the response information is a message in response to the request information.

In some embodiments, the above apparatus may correspond to a chip with a data processing function in a UE, such as a baseband chip, or to a chip module including a chip with a data processing function in a UE, or to a UE.

More details of principles, implementation and advantages of the data transmission apparatus can be referred to the above descriptions and related descriptions of the data transmission method in FIG. 5, and are not repeated here.

The technical solutions of the present disclosure can be applied to 5G, 4G or 3G communication systems, and various new communication systems in the future, such as 6G and 7G communication systems.

In an embodiment of the present disclosure, a storage medium having computer instructions stored therein is provided, where when the computer instructions are executed by a processor, the above method is performed. In some embodiments, the storage medium may be a computer-readable storage medium, for example, including a non-volatile or a non-transitory memory, or including a compact disc, a hard disk drive or a solid state drive.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, where the memory has computer instructions stored therein, and when the processor executes the computer instructions, the above method is performed. The terminal may include but not limited to a mobile phone, a computer or a tablet computer.

The terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

In an embodiment of the present disclosure, a base station including a memory and a processor is provided, where the memory has computer instructions stored therein, and when the processor executes the computer instructions, the above method is performed.

The base station in the embodiments of the present disclosure may also be referred to as a base station equipment, and is a device deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The base station controller in the embodiments of the present disclosure is a device for managing base stations, such as a Base Station Controller (BSC) in a 2G network, a Radio Network Controller (RNC) in a 3G network, or a device that controls and manages a base station in a new communication system in the future.

The network in the embodiments of the present disclosure refers to a communication network that provides communication services for terminals, including a base station of a radio access network, a base station controller of a radio access network, and a device on a core network side.

Each module/unit of each apparatus and product described in the above embodiments may be a software module/unit or a hardware module/unit, or may be a software module/unit in part, and a hardware module/unit in part. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data transmission method, comprising:

receiving request information, wherein the request information comprises an upper layer instruction; and receiving reference information, wherein the reference information is used to describe response information, and the reference information comprises a waiting duration between receiving the upper layer instruction from a UE access layer and transmitting the request information by the UE access layer;

wherein the response information is a message in response to the request information;

wherein the method further comprises: calculating a time point when the response information reaches a base station based on the waiting duration;

wherein said calculating the time point when the response information reaches the base station based on the waiting duration comprises:

determining an RTT duration from a time point when a UE application layer transmits the upper layer instruction to a time point when the UE application layer receives the response information from a server;

determine a T2 duration from a time point when the UE transmits the request information to a time point when the base station receives the request information; and calculating the time point when the response information reaches the base station based on the waiting duration, the RTT duration and the T2 duration;

wherein a time point when the server transmits the response information is calculated based on the waiting duration, the RTT duration and the T2 duration using a following formula:

$$T = RTT/2 - (T1 + T2),$$

where T is the time point when the server transmits the response information, RTT is the RTT duration from the time point when the UE application layer transmits the upper layer instruction to the time point when the UE application layer receives the response information from the server, T1 is a waiting duration from the time point when the UE application layer transmits the upper layer instruction to the time point when the UE transmits the request information, and T2 is the T2 duration from the time point when the UE transmits the request information to the time point when the base station receives the request information; or the time point when the server transmits the response information is calculated based on the waiting duration, the RTT duration and the T2 duration using a following formula:

$$T = RTT - (PDB - N3) - (T1 + T2),$$

where T is the time point when the server transmits the response information, RTT is the RTT duration from the time point when the UE application layer transmits the upper layer instruction to the time point when the UE application layer receives the response information from the server, T1 is the waiting duration from the time point when the UE application layer transmits the upper layer instruction to the time point when the UE transmits the request information, T2 is the T2 duration from the time point when the UE transmits the request information to the time point when the base station receives the request information, PDB is a predicted duration between a time point when a gateway transmits the response information and a time point when the UE receives the response information, and N3 is a predicted duration between the time point when the gateway transmits the response information and a time point when the base station receives the response information.

2. The data transmission method according to claim 1, wherein the reference information comprises an importance level of the response information or indication information of the importance level.

3. The data transmission method according to claim 1, wherein the reference information comprises a data amount of the response information or indication information of the data amount.

* * * * *